Feb. 5, 1935.　　　G. W. SEYMOUR　　　1,990,098
LAMINATED PRODUCT AND METHOD OF MAKING THE SAME
Original Filed Nov. 13, 1931
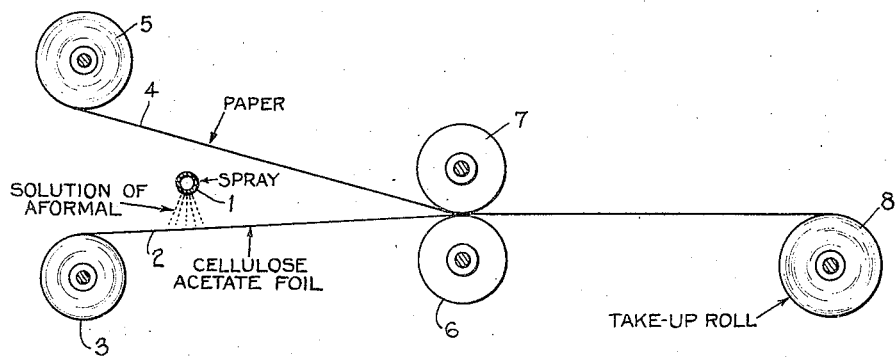
INVENTOR
George W. Seymour
BY
ATTORNEYS

UNITED STATES PATENT OFFICE 1,990,098

LAMINATED PRODUCT AND METHOD OF MAKING THE SAME

George W. Seymour, Cumberland, Md., assignor to Celanese Corporation of America, a corporation of Delaware Original application November 13, 1931, Serial No. 574,928. Divided and this application November 29, 1932, Serial No. 644,891

21 Claims. (Cl. 154—40)

This invention relates to method of preparing laminated products wherein a sheet-like material comprising a derivative of cellulose plastic is caused to adhere to surfaces.

This application is a division of my application S. No. 574,928 filed November 13, 1931.

An object of my invention is to form laminated products by causing a sheet of a derivative of cellulose plastic to adhere to surfaces by the use of a formal or methylene ether. Other objects of this invention will appear from the following detailed description.

The preparation of a laminated product comprising a film or foil of cellulose acetate adhering to a sheet of paper presents considerable difficulty, since when ordinary cellulose acetate solvents are employed to cause the cellulose acetate film to adhere to paper, serious difficulties arise such as curling of the film, the imparting of transparency to the paper, lack of adhesion, spotting, uneven coating, etc.

I have found that formal glycerol or other methylene ether of polyhydric alcohols are excellent solvents for cellulose acetate, particularly the acetone-soluble cellulose acetate, and other organic derivatives of cellulose, and may be employed for at least partially dissolving or softening the surface of a sheet or film containing such derivatives of cellulose which is to be caused to adhere to a surface.

The methylene ether of a polyhydric alcohol may be prepared by the condensation of formaldehyde, formalin, trihydroxymethylene or paraformaldehyde, acetaldehyde, benzaldehyde or other aldehyde with a polyhydric alcohol in the presence of an acid such as hydrochloric acid or phosphoric acid. The polyhydric alcohol employed in the polymerization may be a simple polyhydric alcohol such as glycerol, ethylene glycol, or propylene glycol, or it may be a substituted polyhydric alcohol such as glycerol mono chlorhydrin, or diethylene glycol.

Formalglycerol having the structural formulæ of

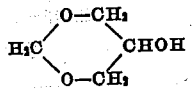

and/or

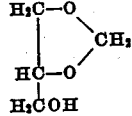

may be prepared in any suitable manner, for instance, by refluxing equimolecular proportions of glycerol or polyglycerol with formalin, tri-hydroxymethylene or paraformaldehyde in the presence of hydrochloric acid (HCl) or other suitable catalyst. It has a boiling point of 193° C. and therefore is very valuable as a higher boiling solvent in lacquers containing cellulose acetate. Moreover it is soluble in all of the common solvents of cellulose acetate and may therefore be employed in conjunction with such solvents. Furthermore it is soluble in water and therefore is highly useful in such cases where a water-soluble solvent is desired.

Formal-glycol, or the methylene ether of ethylene glycol, having the structural formula

may be prepared by heating under reflux equimolecular proportions of ethylene glycol and paraformaldehyde in the presence of HCl or other suitable catalysts. Its boiling point is 73° C. and has a high solvent power for cellulose acetate and other organic derivatives of cellulose.

Formal-propylene glycol, or the methylene ether of propylene glycol, having the structural formula

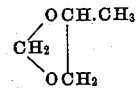

is a new compound. It may be made by refluxing 154 grams of propylene glycol with 60 grams of paraformaldehyde and 10 cc. of concentrated hydrochloric acid for 18 to 20 hours and separating out by fractional distillation the fraction boiling at 82° to 87. It is an excellent solvent for cellulose acetate or other organic derivatives of cellulose.

Formal-glycerol mono chlorhydrin, or the methylene ether or glycerine monochlorhydrin, having the structural formula of

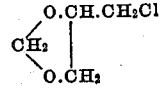

may be prepared by refluxing 110 grams of glycerol monochlorhydrin with 30 grams of paraformaldehyde in the presence of 5 cc. of concentrated HCl. It has a boiling point of 146° C. and is an excellent medium boiling solvent for cellulose acetate or other organic derivatives of cellulose.

Formal-diethylene glycol, or the methylene ether of diethylene glycol, having the probable structural formula of

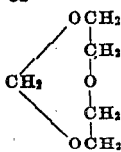

is a new compound and may be formed by refluxing for 18 hours, 106 grams of diethylene glycol with 30 grams of paraformaldehyde in the presence of 5 cc. of concentrated HCl. The resulting material is fractionally distilled and the fraction boiling between 180 and 240° C. is separated. This is an excellent solvent for cellulose acetate and other derivatives of cellulose.

The above mentioned methylene ethers of polyhydric alcohols are excellent solvents for derivatives of cellulose as is shown by the following table of dilution ratios. These dilution ratios are expressed in the number of cc. of alcohol and benzene that may be added to a solution of 3 grams of acetone soluble cellulose acetate dissolved in 63 cc. of the solvent.

| Solvent | Dilution ratio | |
| --- | --- | --- |
| | Alcohol | Benzene |
| Acetone | 18.33 | 10.01 |
| Formal glycol | 30.88 | 11.03 |
| Formal propylene glycol | 21.21 | 1.58 |
| Formal glycerol | 30.77 | 33.0 |

It will be seen that for acetone soluble cellulose acetate, these methylene ethers of polyhydric alcohols are better solvents in many respects than acetone itself.

As stated, the formalglycerol or other methylene ether of a polyhydric alcohol may be used wherever it is desired to dissolve partially or wholly derivatives of cellulose, such as cellulose nitrate but particularly the organic derivatives of cellulose such as organic esters of cellulose and cellulose ethers. Examples of organic esters of cellulose being cellulose acetate, cellulose formate, cellulose butyrate, while examples of cellulose ethers are ethyl cellulose, methyl cellulose and benzyl cellulose.

A very important application of this invention is for use of an adhesive, for instance, for the causing of thin foils of acetone-soluble cellulose acetate to adhere to paper, photographs, prints, woven fabrics, pasteboard, wood veneer and the like to impart thereto a more or less glossy surface which is superior to that produced by the spraying of lacquers. When attempts are made to employ ordinary solvents or adhesives to cause such foil to adhere to the surface, many defects occur, such as curling of the film or foil as soon as the solvent is applied, wetting of the paper and thus making it transparent, change of color upon exposure to light, etc. I have found that formalglycerol or other methylene ether of a polyhydric alcohol either alone or diluted with a liquid in which it is soluble but which liquid is a non-solvent for the cellulose acetate, is applied by spraying, brushing, dipping or otherwise, to a foil comprising cellulose acetate, it may then be caused to adhere to paper or the other above mentioned materials to form highly satisfactory lacquer-like surfaces without any difficulty or the development of defects, and without causing the paper to become transparent or translucent.

The figure on the accompanying drawing shows diagrammatically one of the many modes of carrying out this invention.

For instance, a mixture consisting of one (1) part by weight of formalglycerol and four (4) parts by weight of benzene is sprayed lightly through spray device 1 on the back of a foil 2 of 0.001" thickness, which foil is made of cellulose acetate and plasticizers, the foil 2 being drawn from roll 3 to give a mist coating and just slightly dampen the film. A paper 4 having any desired printed matter thereon, as for example such as is used for wrapping cigarettes drawn from roll 5 is laid on the dampened side of the foil and the assembly is pressed between rolls 6 and 7 or in any suitable manner at ordinary temperatures, although elevated temperatures may be used if desired. The foil adheres very firmly to the paper to present a glossy and beautiful surface, and the laminated product is wound up in roll 8.

If desired besides the formalglycerol or other methylene ether of a polyhydric alcohol, other solvents may be used in addition thereto, such as low boiling solvents like acetone, ethylene dichloride and the like, and medium and/or high boiling solvents such as ethyl acetate, ethyl lactate, tetrachlorethane or diacetone alcohol. Examples of plasticizers for cellulose acetate are diphenylol propane, triacetin, dibutyl tartrate, diethyl phthalate, monomethylene xylene sulfonamid, triphenyl phosphate, etc.

It is to be understood that the foregoing description is given merely by way of illustration and that many variations may be made therein without departing from the spirit of my invention.

Having described my invention, what I desire to secure by Letters Patent is:

1. Method of causing a sheet comprising a derivative of cellulose to adhere directly to a surface of a different material comprising applying to at least one side of said sheet a substance comprising a condensation product of a polyhydric alcohol with an aldehyde and then pressing the side of the sheet having the condensation product of the polyhydric alcohol with an aldehyde thereon on to the surface.

2. Method of causing a sheet comprising an organic derivative of cellulose to directly adhere to a surface of a different material, which comprises applying to at least one side of said sheet a substance comprising a condensation product of a polyhydric alcohol with an aldehyde and then pressing the side of the sheet having the condensation product of the polyhydric alcohol with an aldehyde thereon on to the surface.

3. Method of causing a sheet comprising cellulose acetate to adhere directly to a surface free from a derivative of cellulose comprising applying to at least one side of said sheet a substance comprising a condensation product of a polyhydric alcohol with an aldehyde and then pressing the side of the sheet having the condensation product of the polyhydric alcohol with an aldehyde thereon on to the surface.

4. Method of causing a sheet comprising a derivative of cellulose to adhere directly to a surface of a different material comprising applying to at least one side of said sheet a substance comprising a methylene ether of a polyhydric alcohol and then pressing the side of the foil having the methylene ether of a polyhydric alcohol thereon on to the surface.

5. Method of causing a sheet containing a derivative of cellulose to adhere directly to a surface of a different material which comprises applying to at least one side of said sheet a substance comprising a condensation product of a compound selected from the group consisting of glycols and glycerol with an aldehyde and then pressing the side of the sheet having such condensation product thereon on to the surface.

6. Method of causing a sheet containing cellulose acetate to adhere directly to a surface free from a derivative of cellulose which comprises applying to at least one side of said sheet a substance comprising a condensation product of a compound selected from the group consisting of glycols and glycerol with an aldehyde and then pressing the side of the sheet having such condensation product thereon on to the surface.

7. Method of causing a sheet containing cellulose acetate to adhere directly to a surface free from a derivative of cellulose which comprises applying to at least one side of said sheet a substance comprising a formal glycol, and then pressing the side of the sheet having the formal glycol thereon on to the surface.

8. Method of causing a sheet containing cellulose acetate to adhere directly to a surface of paper which comprises applying to at least one side of said sheet a substance comprising a formal glycol, and then pressing the side of the sheet having the formal glycol thereon on to the surface of the paper.

9. Method of causing a sheet comprising cellulose acetate to adhere directly to a surface free from a derivative of cellulose comprising applying to at least one side of said sheet a substance comprising a formalglycerol, and then pressing the side of the foil having the formalglycerol thereon onto the surface.

10. Method of causing a sheet comprising cellulose acetate to adhere directly to a surface of paper comprising applying to at least one side of said sheet a substance comprising a formalglycerol, and then pressing the side of the foil having the formalglycerol thereon on to the surface of the paper.

11. An article having a surface thereof directly coated with a layer of material comprising a derivative of cellulose which has been at least softened by means of a condensation product of a polyhydric alcohol with an aldehyde.

12. An article having a surface thereof directly coated with a layer of material comprising an organic derivative of cellulose which has been at least softened by means of a condensation product of a polyhydric alcohol with an aldehyde.

13. An article having a surface thereof directly coated with a layer of material comprising cellulose acetate which has been at least softened by means of a condensation product of a polyhydric alcohol with an aldehyde.

14. An article having a surface thereof directly coated with a layer of material comprising an organic derivative of cellulose which has been at least softened by means of a formalglycerol.

15. An article having a surface thereof directly coated with a layer of material comprising cellulose acetate which has been at least softened by means of a formalglycerol.

16. An article having a surface thereof directly coated with a layer of material containing an organic derivative of cellulose which has been at least softened by means of a formal glycol.

17. An article having a surface thereof directly coated with a layer of material containing cellulose acetate which has been at least softened by means of a formal glycol.

18. A sheet of paper coated with a thin foil containing an organic derivative of cellulose which has been at least softened by means of a condensation product of a polyhydric alcohol with an aldehyde, said foil adhering firmly and directly to the sheet of paper to present a glossy, smooth surface.

19. A sheet of paper coated with a thin foil containing cellulose acetate which has been at least softened by means of a condensation product of a compound selected from the group consisting of glycols and glycerol with an aldehyde, said foil adhering firmly and directly to the sheet of paper to present a glossy, smooth surface.

20. A sheet of paper coated with a thin foil containing cellulose acetate which has been at least softened by means of a formal glycerol, said foil adhering firmly and directly to the sheet of paper to present a glossy, smooth surface.

21. A sheet of paper coated with a thin foil containing cellulose acetate which has been at least softened by means of a formal glycol, said foil adhering firmly and directly to the sheet of paper to present a glossy, smooth surface.

GEORGE W. SEYMOUR.